United States Patent
Li (10) Patent No.: US 9,606,886 B2
(45) Date of Patent: Mar. 28, 2017

(54) METHOD AND DEVICE FOR MEASURING SYSTEM PERFORMANCE IN REAL TIME

(75) Inventor: Pan Li, Shenzhen (CN)

(73) Assignee: ZTE Corporation, Shenzhen, GD (CN)

( * ) Notice: Subject to any disclaimer, the term of this patent is extended or adjusted under 35 U.S.C. 154(b) by 1051 days.

(21) Appl. No.: 13/822,812

(22) PCT Filed: Jul. 6, 2011

(86) PCT No.: PCT/CN2011/076924
§ 371 (c)(1),
(2), (4) Date: Mar. 13, 2013

(87) PCT Pub. No.: WO2012/034445
PCT Pub. Date: Mar. 22, 2012

(65) Prior Publication Data
US 2013/0179122 A1 Jul. 11, 2013

(30) Foreign Application Priority Data
Sep. 13, 2010 (CN) .......................... 2010 1 0286814

(51) Int. Cl.
*H04W 24/10* (2009.01)
*H04L 12/26* (2006.01)
(Continued)

(52) U.S. Cl.
CPC ........ *G06F 11/3065* (2013.01); *H04L 43/062* (2013.01); *H04W 24/08* (2013.01);
(Continued)

(58) Field of Classification Search
None
See application file for complete search history.

(56) References Cited

U.S. PATENT DOCUMENTS 7,111,059 B1 * 9/2006 Garcea .............. G06F 11/3447
  702/182
8,000,946 B2 * 8/2011 Haas .................. G06F 17/5009
  700/100

(Continued)

FOREIGN PATENT DOCUMENTS

CN 101114875 1/2008
CN 101136779 3/2008
(Continued)

OTHER PUBLICATIONS

An English Translation of an International Search Report dated Oct. 20, 2011, issued during the prosecution of Applicant's PCT/CN2011/076924.

(Continued)

*Primary Examiner* — Gregory J Toatley
*Assistant Examiner* — Michael Dalbo
(74) *Attorney, Agent, or Firm* — Diederiks & Whitelaw, PLC (57) ABSTRACT

Disclosed are method and device for measuring system performance in real time. The method includes: the foreground receives a real-time measurement task comprising a measurement period parameter constructed by the background according to the concerned service data, with the quantity of the service data being lower than a preset value; the foreground extracts the current data corresponding to the real-time measurement task from a performance measurement cache area according to the measurement period parameter; the foreground acquires the real-time measurement data corresponding to the real-time measurement task according to the current data; and the foreground reports the real-time measurement data to the background. In the present invention, the background sends the concerned service
(Continued)

data to the foreground by way of a real-time measurement task, and the foreground merely reports few service data.

12 Claims, 4 Drawing Sheets (51) Int. Cl.
G06F 11/30 (2006.01)
G06F 11/34 (2006.01)
H04W 24/08 (2009.01)

(52) U.S. Cl.
CPC ...... *G06F 11/3409* (2013.01); *G06F 11/3466* (2013.01); *G06F 11/3476* (2013.01); *G06F 11/3495* (2013.01); *H04L 43/0829* (2013.01); *H04L 43/106* (2013.01); *H04W 24/10* (2013.01)

(56) References Cited

U.S. PATENT DOCUMENTS

2005/0289232 A1* 12/2005 Ebert .................. G06F 11/3419
709/224
2006/0259274 A1* 11/2006 Greco ................. G06F 11/3409
702/182
2008/0065442 A1* 3/2008 Bayer .................. G06F 11/3447
702/186
2009/0064255 A1* 3/2009 Jiang ...................... H04N 7/173
725/118
2009/0222549 A1* 9/2009 Gilbert ................ G06F 11/3409
709/224

FOREIGN PATENT DOCUMENTS

| CN | 101321359 | 12/2008 |
| JP | 2000295217 | 10/2000 |
| JP | 3540225 B2 | 7/2007 |
| WO | 2012/034445 | 3/2012 |

OTHER PUBLICATIONS

An English Translation of a Written Opinion dated Oct. 20, 2011, which issued during the prosecution of Applicant's PCT/CN2011/076924.
An English Translation of an International Preliminary Report on Patentability dated Apr. 16, 2013, which issued during the prosecution of Applicant's PCT/CN2011/076924.

* cited by examiner

METHOD AND DEVICE FOR MEASURING SYSTEM PERFORMANCE IN REAL TIME

CROSS-REFERENCE TO RELATED APPLICATIONS

This application represents a National Stage application of PCT/CN2011/076924 entitled "Method and Device for Measuring System Performance in Real Time" filed Jul. 6, 2011, pending.

FIELD OF THE INVENTION

The present invention relates to the technical field of service support in communication industry, and particularly to a method and a device for measuring system performance in real time.

BACKGROUND OF THE INVENTION

System performance measurement is an important function in the communication field. By collecting the system and service performance data and monitoring some service events and data information in real time during the running of the system, the operation and maintenance personnel is provided with data basis for network optimization and troubleshooting.

In the rapidly changing network environment, strict requirements are put on the inspection granularity and timeliness of the optimization related performance data. The operation and maintenance personnel has to pay attention to the changes in the key parameters in real time. For example, in the long term evolution (LTE) system network, which has functions such as self-configuration, self-optimization etc., rapid auto-adjustment, configuration and optimization may occur to various parameters in the embedded base station system. During network maintenance, attention has to be paid thereon in real time.

Currently, the time granularity of the commonly used performance measurement period is 15 min. However, the granularity requirement of real-time performance measurement is at least at second level. Therefore, the commonly used performance measurement system still cannot meet the real-time requirements for the time being. At present, the commonly used performance measurement system cannot be directly used in real-time performance measurement, and the reasons are as follows:

1. The commonly used performance measurement period is usually 15 min or a fixed period which is a multiplication of 15 min. Therefore, it is usually designed to employ storage of large scale of statistics data and uniform data reporting per 15 min. Briefly, there are much received, but few reported. Such period design mainly considers the statistics and aggregated reporting of large scale of service data. If the measurement period is narrowed to realize real-time performance measurement, for example, narrowed to 10 s, then it causes more data to be received, and more data to be reported. This will generate frequency communication interaction and a large amount of data transmission, and occupy the transmission resources of the system for a long time. As such, it cannot meet the basic performance requirements of the LTE system and cannot meet the real-time inspection requirements of special performance data.

2. The commonly used performance measurement task is sent by the background and will not change within one measurement period. Such design ensures the data consistency within one period. If the task is changed halfway, it will cause statistics data exception at the early and later section of the period. However, such measurement task management manner is not flexible enough. Especially, when it is required to observe special performance data temporarily, the task sending and data collection operations cannot be performed. Therefore, such task management manner cannot be applied in the real-time performance system.

The common real-time data statistics method is: the foreground base station aggregates all the data to be concerned to the background in real time according to the timestamp as the identifier and records the same into the background server. Although such method can make retrieval and query with any granularity, since there are a large amount of statistics of service data to be worked out, the communication traffic between the foreground and background is increased and it requires a large amount of additional storage space. For example, independent background service devices are required, which brings inconvenience and addition overhead to network planning and maintenance.

An application of the above real-time data statistics method is in the 2G or 3G base station controller. In such network architecture, the statistics data of a plurality of base stations can be aggregated at the base station controller. The background can directly perform the retrieval and query operation on the base station controller, increasing the operation convenience. However, as to a flattened LTE base station, there is no such devices as base station controller. The background operation and maintenance center (abbreviated as OMC) is directly connected to the foreground base station. The OMC needs to manage a plurality of base stations simultaneously. If all the data are aggregated to the background OMC for processing, it will inevitably increases the processing pressure of the OMC, and at the same time increase the communication traffic between the foreground and background.

During the implementation of the present invention, the inventors have found out that the method for measuring system performance in real time in the related art has the following defects that: the foreground aggregates all the system performance data to be concerned to the background in real time, the transmission of system performance data occupies a large amount of communication resources, and the pressure of background data processing is high.

SUMMARY OF THE INVENTION

The present invention is to provide a method and a device for measuring system performance in real time. This solution may solve the problem that in the above method for measuring system performance in real time, the transmission of system performance data occupies a large amount of communication resources and the pressure of background data processing is high.

A method for measuring system performance in real time is provided according to one aspect of the present invention, comprising: a foreground receiving a real-time measurement task comprising a measurement period parameter, wherein the real-time measurement task is constructed by a background according to concerned service data, and quantity of the service data is lower than a preset value; the foreground extracting current data corresponding to the real-time measurement task from a performance measurement cache area according to the measurement period parameter; the foreground acquiring real-time measurement data corresponding to the real-time measurement task according to the current data; and the foreground reporting the real-time measurement data to the background.

The quantity of the service data is 1.

When there are a plurality of the real-time measurement tasks: before the foreground extracts the current data corresponding to the real-time measurement task from the performance measurement cache area, the method further comprises: setting a reference timer with a preset duration; and when the reference timer times out, the foreground scanning all the current real-time measurement tasks one by one and judging whether a measurement period of each real-time measurement task has arrived according to the measurement period parameter of the each real-time measurement task and current time; and the foreground extracting the current data corresponding to the real-time measurement task from the performance measurement cache area comprises: when the measurement period of one of all the real-time measurement tasks arrives, the foreground extracting the current data corresponding to the one of all the real-time measurement tasks from the performance measurement cache area.

The measurement period parameter is greater than or equal to 5 s and less than or equal to 300 s.

Before the foreground scans all the current real-time measurement tasks one by one, the method further comprises: ranking the each real-time measurement task in all the current real-time measurement tasks according to an ascending order of the measurement period parameter; and the foreground scanning all the current real-time measurement tasks one by one comprises: when it is determined that the measurement period of the one of all the real-time measurement tasks has not arrived, stopping scanning the real-time measurement task after the one of all the real-time measurement tasks.

The foreground acquiring the real-time measurement data corresponding to the real-time measurement task according to the current data comprises: obtaining the real-time measurement data by an operation according to the current data and history data when a previous measurement period arrived; and recording the current data as the history data for a next calculation.

The above method can further comprise: when a conventional performance measurement period arrives, by the measurement period parameter of each real-time measurement task and a current time, determining the real-time measurement task, arrival time of two adjacent measurement periods of which spans the conventional performance measurement period; and recording the current data corresponding to the real-time measurement task spanning the conventional performance measurement period into a temporary data area; and obtaining real-time measurement data by the operation according to the current data and the history data when the previous measurement period arrived comprises: checking whether the arrival time of two adjacent measurement periods of the real-time measurement task spans the conventional performance measurement period, and if yes, then obtaining the real-time measurement data corresponding to the real-time measurement task by an operation according to the current data, the current data recorded in the temporary data area and the history data of the current data.

The above background is an operation and maintenance center and the foreground is a base station.

A device for measuring device performance in real time is provided according to another aspect of the present invention, located at a foreground and comprising: a task receiving module, configured to receive a real-time measurement task comprising a measurement period parameter, wherein the real-time measurement task is constructed by a background according to concerned service data, and quantity of the service data is lower than a preset value; a data extraction module, configured to extract current data corresponding to the real-time measurement task from a performance measurement cache area according to the measurement period parameter; a data processing module, configured to acquire real-time measurement data corresponding to the real-time measurement task according to the current data; and a data reporting module, configured to report the real-time measurement data to the background.

The quantity of the service data is 1.

The data processing module comprises: a data acquisition sub-module, configured to obtain the real-time measurement data by an operation according to value of the current data and history data when a previous measurement period arrived; and a history data storage sub-module, configured to record the real-time measurement data to be used as the history data during a next calculation.

The data processing module further comprises: a temporary data storage sub-module, configured to, when a conventional performance measurement period arrives, by the measurement period parameter of each real-time measurement task and a current time, determine the real-time measurement task, arrival time of two adjacent measurement periods of which spans the conventional performance measurement period; and record the current data corresponding to the real-time measurement task spanning the conventional performance measurement period into a temporary data area; and a determination sub-module, configured to check whether the real-time measurement task spans the conventional performance measurement period; and the data acquisition sub-module is configured to, when the arrival time of two adjacent measurement periods of the real-time measurement task spans the conventional performance measurement period, obtain the real-time measurement data corresponding to the real-time measurement task by an operation according to the current data recorded in the temporary data area, the current data and the history data of the current data.

In the present invention, the background sends the concerned service data to the foreground by way of a real-time measurement task. The foreground merely reports a few service data, thus relieving the communication traffic of the foreground/background, lowering the processing pressure of the background, and improving the flexibility of setting the measurement data report.

Other features and advantages of the present invention will be set forth in the subsequent specification, and partly become apparent from the specification or are understood by implementing the present invention. The objects and other advantages of the present invention can be realized and obtained by the particularly specified structures in the specification, claims and drawings.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will be described hereinafter in detail with reference to the drawings and in conjunction with embodiments. It needs to be noted that the embodiments of the present application and the features in the embodiments can be combined with each other if there is no conflict. Hereinafter, the embodiments of the present invention will be further described in detail.

Embodiment I

Figure 1:
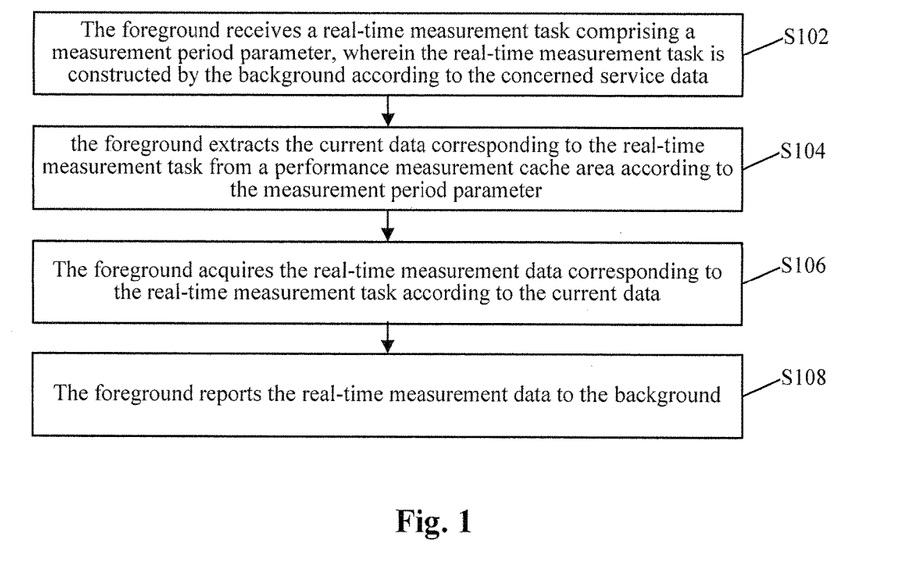
FIG. 1 is a flowchart of a method for measuring system performance in real time according to embodiment I of the present invention.

FIG. 1 is a flowchart of a method for measuring system performance in real time according to embodiment I of the present invention. As shown in FIG. 1, the present embodiment includes the following steps.

Step S102, the foreground receives a real-time measurement task comprising a measurement period parameter, wherein the real-time measurement task is constructed by the background according to the concerned service data, and the quantity of the service data is lower than a preset value.

Step S104, the foreground extracts the current data corresponding to the real-time measurement task from a performance measurement cache area according to the measurement period parameter.

Step S106, the foreground acquires the real-time measurement data corresponding to the real-time measurement task according to the current data.

Step S108, the foreground reports the real-time measurement data to the background.

In this embodiment, the quantity of the service data concerned by each service data task is preferably 1. The measurement period parameter is greater than or equal to 5 s and less than or equal to 300 s, and is preferably 5 s, 10 s or 50 s. The background is the operation and maintenance center, and the foreground is the base station. The background can send the real-time measurement task to the foreground by way of the reliable user datagram protocol (RUDP).

In the conventional real-time data statistics method, the foreground aggregates all the measurement data to the background, increasing the communication traffic between the foreground and the background and increasing the processing pressure of the background. However, in the present invention, the background sends the concerned service data to the foreground by way of a real-time measurement task, and the foreground merely reports a few service data, thus relieving the communication traffic of the foreground/background, lowering the processing pressure of the background, and improving the flexibility of setting the measurement data report.

Embodiment II

In order to support any measurement period configuration of the real-time performance measurement system, the situation where the period boundary of the real-time measurement task and the period boundary of the conventional performance measurement cannot be aligned will inevitably appear. Taking the real-time measurement task period being 40 s and the conventional performance measurement period being 15 min (900 s) for example, the situation where the real-time measurement task period is just across the 15 min conventional performance measurement granularity period will inevitably appear.

Figure 2:
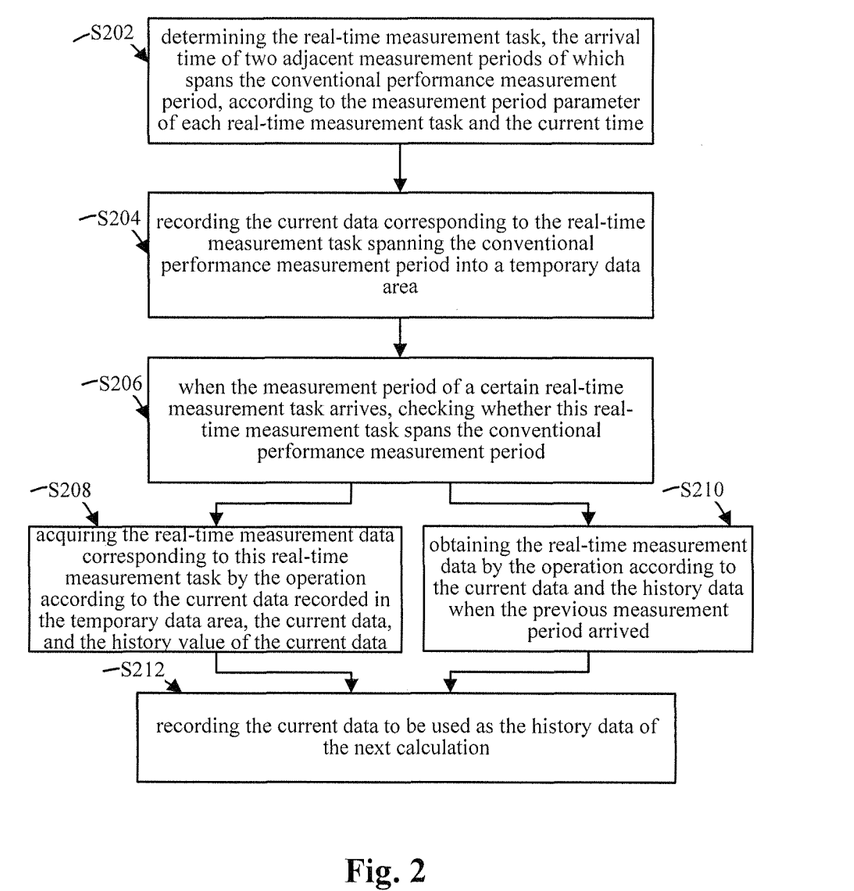
FIG. 2 is a flowchart of obtaining real-time measurement data in a method for measuring system performance in real time according to embodiment II of the present invention.

This embodiment describes the steps that the foreground acquires the real-time measurement data corresponding to the real-time measurement task according to the current data in detail on the basis of embodiment I. FIG. 2 is a flowchart of obtaining real-time measurement data in a method for measuring system performance in real time according to embodiment II of the present invention. As shown in FIG. 2, the present embodiment includes the following steps.

Step S202, when the conventional performance measurement period arrives, determining the real-time measurement task, the arrival time of two adjacent measurement periods of which spans the conventional performance measurement period, according to the measurement period parameter of each real-time measurement task and the current time.

Step S204, the current data corresponding to the real-time measurement task spanning the conventional performance measurement period is recorded into a temporary data area.

Step S206, when the measurement period of a certain real-time measurement task arrives, checking whether this real-time measurement task spans the conventional performance measurement period, and if yes, then performing step S208, otherwise, performing step S210.

Step S208, acquiring the real-time measurement data corresponding to this real-time measurement task by the operation according to the current data recorded in the temporary data area, the current data, and the history value of the current data, and performing step S212.

Step S210, obtaining the real-time measurement data by the operation according to the current data and the history data when the previous measurement period arrived.

Step S212, recording the current data to be used as the history data of the next calculation.

This embodiment solves the situation where the real-time measurement data conflicts with the conventional performance measurement. The applicability of this embodiment is better in addition to having all the beneficial effects of embodiment I.

Embodiment III

This embodiment describes the method for measuring system performance in real time in detail on the basis of embodiments I and II. This embodiment includes the following steps.

Step I: the background sends a real-time measurement task by way of a special design so as to avoid conflict with the conventional performance measurement task.

Specifically, this step comprises that: the background selects the real-time measurement task to be concerned and sends the same to the foreground according to the situation of currently needed real-time data. According to the requirements of real-time, the design of the real-time measurement task needs to meet features such as rapid sending and the target thereof being specific. In this embodiment, the data concerned by the real-time measurement task belongs to a subset of measurement data of the conventional performance measurement system. Generally, one real-time measurement task only relates to one service data, and what the real-time measurement task concerns is shorter measurement period of the measurement data and real-time data change situation.

Step II: the foreground scans all the current real-time measurement tasks so as to determine whether there is any real-time measurement task to be processed.

The foreground sets a reference timer and compares the granularity periods of all the real-time measurement tasks each time the reference timer times out. If the right boundary of a task period is reached, then this real-time measurement task needs to be reported and processed. The above reference timer is designed to employ the maximum timer duration which can meet the system error requirements so as to reduce the effects on the system performance.

Step III: the position of the data in the conventional performance measurement cache area is located according to the real-time measurement task, and the current data is taken.

Specifically, this step comprises that: this embodiment is designed to employ a cache area which multiplexes the conventional performance measurement system. Since the data concerned by the real-time measurement task belongs to a subset of measurement data of the conventional performance measurement system, the cache area does not need to be designed separately. The current data is taken directly from the conventional performance measurement cache area according to the data positioning information carried during task sending.

Step IV: the current taken data is aligned and assembled to obtain the real-time measurement data to be reported in real-time.

Specifically, this step comprises that: the foreground takes the current data from the cache area and carries out relevance operation thereon with the history data value when the real-time measurement granularity arrived last time to obtain the real-time measurement data of this time. For example, this real-time measurement task is an accumulative counter. Then the real-time measurement data of this time is equivalent to the difference value between the current data with the history data when the real-time measurement granularity arrived last time. Before the data processing operation, boundary processing needs to be carried out on the real-time measurement task period and the conventional performance measurement period. For example, the real-time measurement task period is 40 s and the conventional performance measurement period is 15 min, i.e. 900 s. Then the situation where the period of a certain real-time measurement task is just across the 15 min conventional performance measurement granularity period will inevitably appear. The data of the 15 min granularity of the conventional performance measurement will be cleared after the granularity is ended. In this case, it is required to carry out segmented recording on two parts of data values across the 15 min granularity and combine the same before finally reporting the real-time measurement task. And, after the calculation of the real-time measurement data is completed, the current data needs to be recorded in the real-time measurement task according to the particular situation, so as to be used as the history data in next calculation.

Step V: the real-time measurement data to be reported this time is packaged uniformly to be sent to the background, by way of special design so as to avoid conflict with the conventional performance measurement reporting.

The method for measuring system performance in real time in this embodiment realizes flexible real-time measurement configuration in the communication network configuration of the flattened LTE base station. This method occupies fewer system resources with less communication traffic between the foreground and the background. In this embodiment, the service processing flow and the processing logic need not be increased. Service processing design of the conventional performance measurement system is multiplexed directly, reducing the development and maintenance costs. This embodiment does not occupy separate storage space and directly multiplexes the data cache area of the conventional performance measurement system, saving a great deal of system resources. This embodiment realizes distributed real-time performance measurement system by carrying out collection and processing operations on the real-time performance data inside each base station, thus lowering the processing pressure of the background OMC when managing a great deal of base stations. This embodiment can select the real-time measurement task to be concerned for sending and data collection according to the real-time data currently needed by the background. Thus, this solution effectively controls the collection amount and transmission amount of the data, and not only saves system transmission resources, but also can meet the personalized demands of the user.

Embodiment IV

Figure 3:
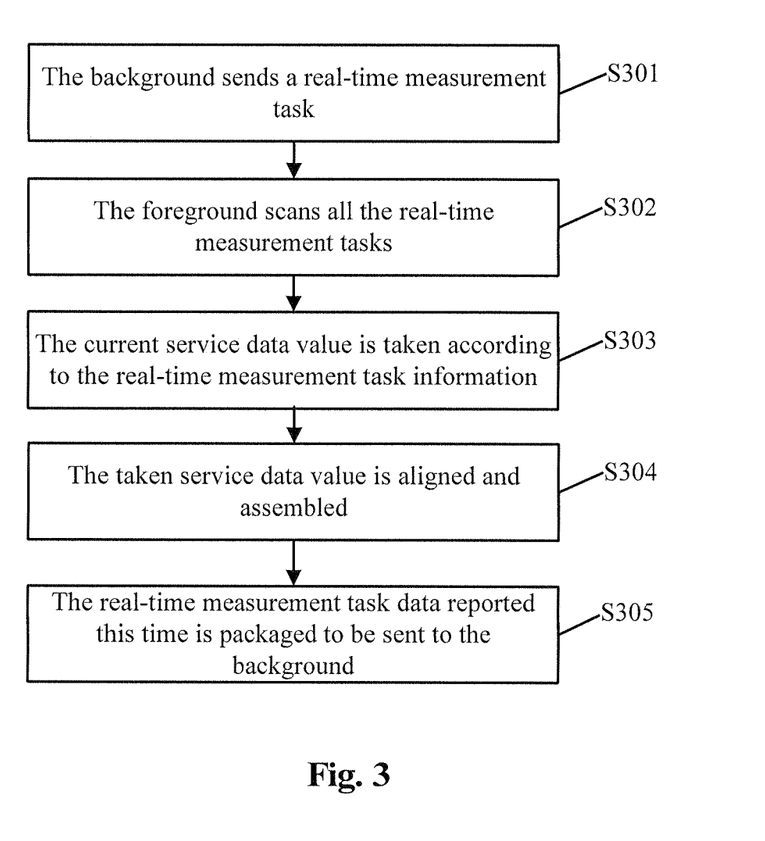
FIG. 3 is a flowchart of a method for measuring system performance in real time according to embodiment IV of the present invention.

FIG. 3 is a flowchart of a method for measuring system performance in real time according to embodiment IV of the present invention. As shown in FIG. 3, the present embodiment includes the following steps.

Step S301: the background sends a real-time measurement task.

The real-time measurement task provided in this embodiment comes from the measurement data of the conventional performance measurement system, belonging to a subset of measurement data of the conventional performance measurement system. The real-time measurement task is only for single measurement data. The measurement data which the real-time measurement task relates to is in the conventional performance measurement data. What the real-time measurement task concerns is shorter measurement period of the measurement data and the change situation of the real-time data. For example, the measurement period of the real-time measurement task can be set as 10 s to 300 s, and taking 10 s as the basic measurement period unit. The measurement period of the real-time measurement task can be divided by 10 s exactly.

The method for sending a real-time measurement task provided in this embodiment needs to redesign the content sent in task and the communication method of the fore/background in order to meet features of rapid sending and specific targeting, and avoid conflict with the conventional performance measurement task. For example, the task sending format can employ the combination of triple identifiers of "measurement type+measurement object+measurement counter" and can position any service data specifically. In addition, the task has to carry the measurement period parameter thereof. For example, it is set as an integral second value with 10 s as unit. The task sending communication method can send the task in the communication manner of RUDP, with flexible and convenient interface and rapid sending.

Step S302, the foreground scans all the real-time measurement tasks.

The real-time measurement task design provided in this embodiment can support the measurement period with any length and meet the personalized user demand of the background. Taking the task design as an example that the measurement period range of the real-time measurement task is from 10 s to 300 s with 10 s as the basic measurement period unit, the foreground set a 1 s reference timer for scanning all the current real-time measurement tasks sent regularly. It is determined whether this real-time measurement task has met the reporting condition, by the comparison and calculation of the real-time measurement task granularity period and the current time. The comparison and calculation method of the real-time measurement task period can use the following method: converting the current system time to number of seconds and performing complementation operation thereon with the period length of the real-time measurement task. If the current system time can be divided exactly by the period length of the real-time measurement task, then it indicates that this real-time measurement task period arrives and reporting processing can be performed. The reporting time of the real-time measurement task has to be boundary aligned with the specific time of the foreground. If the measurement granularity is 10 s, then this system employs the manner of aligning the measurement period with the integral second (00 s, 10 s, . . . , 50 s) of xx min, xx h, xx day, xx month, xx year. In the case of 20 s granularity, it is aligned with (00 s, 20 s, 40 s). Thus, the user can understand the data and process the boundary easily.

In the above, in order to improve the efficiency of periodical scanning, it is necessary to rank and classify the real-time measurement tasks sent by taking the measurement period as the condition. For example, the reporting frequency of short measurement period is definitely higher than that of long measurement period. Therefore, the ranking will be performing according to the ascending order of the measurement period of the real-time measurement task. In addition, it is necessary to design a basic unit for the measurement length of the real-time measurement task. For example, 10 s is set as the basic unit of the measurement period of the real-time measurement task. As such, during the scanning of the real-time measurement task after ranking, if the basic unit of the task measurement period cannot meet the reporting condition, then the long task measurement period afterwards will not meet the reporting condition either, which can reduce unnecessary scanning and thus system efficiency is improved.

Step S303, the current service data value is taken according to the real-time measurement task information.

The data collection method provided in this embodiment multiplexes the service data collection flow and the data cache area in the conventional performance measurement system. Since the concerned data of the real-time measurement task belongs to a subset of measurement data of the conventional performance measurement system, during the normal running of the performance measurement system, the data needed by the real-time measurement task already exists in the cache area, and thus no new storage space is needed separately.

The data collection method provided in this embodiment first acquires the memory location of the data in the conventional cache area by way of the data positioning information in the real-time measurement task, and then takes the specific data value according to the attributes of the data. For example, the task sending format can employ the real-time measurement task of the combination of triple identifiers: "measurement type+measurement object+measurement counter". The positioning manner of the cache area comprises that: the logic location of a service data counter is positioned directly by way of the triple combination identifier, that is, the nth measurement counter of the nth measurement object of the nth measurement type, then the specific counter data address can be positioned by way of memory structure searching according to the triple combination positioning manner of conventional performance measurement. Memory read operation is carried out on the data according to the attributes of this counter. For example, for the accumulative counter, the data value can be directly read. For the average counter, the intermediate data such as accumulated sum, accumulated number, etc. needs to be taken from this memory address, and then the final current data value of the counter is obtained by calculation of division operation.

Step S304, the taken service data value is aligned and assembled.

The service data value processing method provided in this embodiment includes three portions of boundary adjustment, data processing and data history recording.

Figure 4:
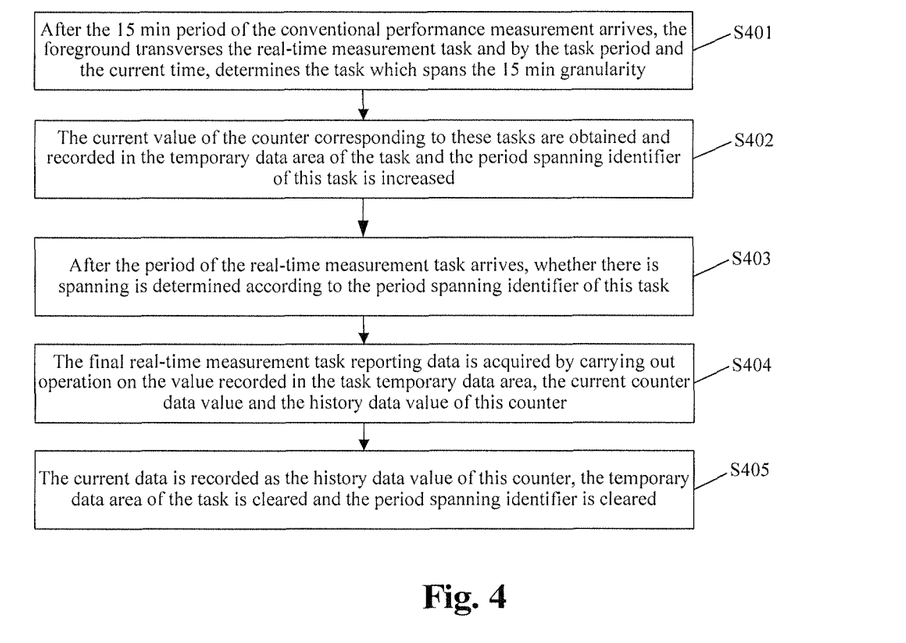
FIG. 4 is a flowchart of aligning and assembling real-time measurement data in a method for measuring system performance in real time according to embodiment IV of the present invention.

In order to support any measurement period configuration of the real-time performance measurement system, the situation where the period boundary of the real-time measurement task and the period boundary of the conventional performance measurement cannot be aligned will inevitably appear. Taking the real-time measurement task period being 40 s and the conventional performance measurement period being 15 min (900 s) for example, the situation where the real-time measurement task period is just across the 15 min conventional performance measurement granularity period will inevitably appear. In this case, the two portions of spanning data values need to be recorded in segment. FIG. 4 is a flowchart of aligning and assembling real-time measurement data in a method for measuring system performance in real time according to embodiment IV of the present invention. As shown in FIG. 4, the detailed description is as follows. Step S401, after the 15 min period of the conventional performance measurement arrives, the foreground transverses the real-time measurement tasks, and by the task period and the current time, determines the task which spans the 15 min granularity. Step S402, the current value of the counter corresponding to the task is obtained and recorded in the temporary data area of the task and the period spanning identifier of this task is increased.

Step S403, after the period of the real-time measurement task arrives, the data value of the corresponding counter is acquired from the current cache area, and whether there is spanning is determined according to the period spanning identifier of this task. For example, whether there is a task spanning the 15 min granularity is checked. If there is, then step S404 is performed. Step S404, the final real-time measurement task reporting data is acquired by carrying out operation on the value recorded in the temporary data area of the task, the current counter data value and the history data value of this counter. Step S405, the current data is recorded as the history data value of this counter, and at the same time the temporary data area of the task is cleared and the period spanning identifier is cleared. For example, after the real-time measurement task period of the accumulative counter arrives, if there is no situation of the spanning of 15 min granularity, then the real-time measurement data is equal to the difference value between the data value in the current memory and the history data value. If there is spanning, then the real-time measurement data is equal to the data value in the current memory plus the data in the temporary data area before spanning and subtracted by the history data value.

After the calculation of the real-time measurement data is completed, the current data becomes a history value and needs to be recorded as the history data for the next real-time measurement task period.

Step S305, the real-time measurement task data reported this time is packaged to be sent to the background.

In this embodiment, the foreground scans all the current real-time measurement tasks by the period to find a task meeting the reporting condition, and acquires the specific data value to be reported by the above calculation method. In addition, the foreground also needs to assemble the task and data to be reported, adds a timestamp identifier, and takes a plurality of task data and the task identifier as a pair of data groups to be packaged to be sent to the background. For example, the specific time of packaging, i.e. the current reporting time xx s, xx min, xx h, xx day, xx month, xx year, is added. Then, when parsing the data packet at the background, the time classification processing can be done conveniently and it can be used to check whether there is loss of data packet.

This embodiment is a more detailed description of embodiments I to III, and possesses all the beneficial effects of the above embodiments, which will not be repeated here.

Embodiment V

Figure 5:
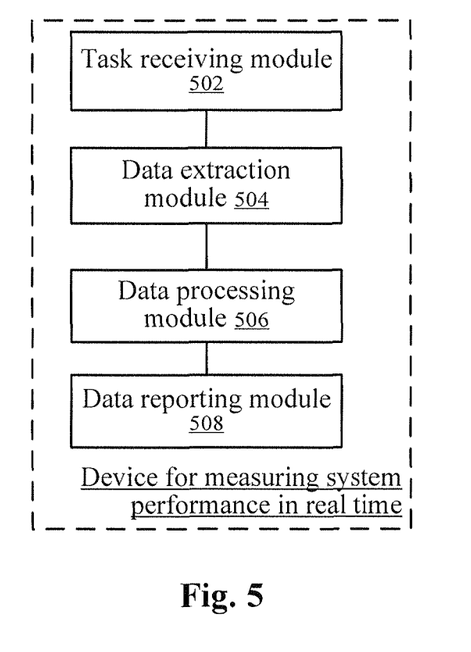
FIG. 5 is a schematic diagram of a device for measuring device performance in real time according to embodiment V of the present invention.

FIG. 5 is a schematic diagram of a device for measuring device performance in real time according to embodiment V of the present invention. As shown in FIG. 5, this embodiment includes: a task receiving module 502, configured to receive a real-time measurement task comprising a measurement period parameter, wherein the real-time measurement task is constructed by the background according to the concerned service data, and the quantity of the service data is lower than a preset value; a data extraction module 504, connected to the task receiving module 502 and configured to extract the current data corresponding to the real-time measurement task from a performance measurement cache area according to the measurement period parameters; a data processing module 506, connected to the data extraction module 504 and configured to acquire the real-time measurement data corresponding to the real-time measurement task according to the current data; and a data reporting module 508, connected to the data processing module 506 and configured to report the real-time measurement data to the background.

In this embodiment, the device for measuring device performance in real time is located at the foreground. The quantity of service data is preferably 1. The measurement period is preferably below 60 s. The relevant description of embodiment I can be referred to for the implementation of this embodiment. This embodiment possesses all the beneficial effects of the above embodiments, which will not be repeated here.

Embodiment VI

This embodiment further describes the composition of the data processing module on the basis of embodiment V.

In this embodiment, the data processing module includes:

a temporary data storage sub-module, configured to, when a conventional performance measurement period arrives, determine a real-time measurement task, the arrival time of two adjacent measurement periods of which spans the conventional performance measurement period, by the measurement period parameter of each real-time measurement task and the current time; and record the current data corresponding to the real-time measurement task spanning the conventional performance measurement period into a temporary data area;

a determination sub-module, configured to check whether the real-time measurement task spans the conventional performance measurement period;

a data acquisition sub-module, configured to, when the real-time measurement task spans the conventional performance measurement period, obtain the real-time measurement data corresponding to the real-time measurement task by the operation according to the current data recorded in the temporary data area, the current data and the history value of the current data; and when the real-time measurement task does not span the conventional performance measurement period, obtain the real-time measurement data by operation according to the current data value and the history data when the measurement period arrived last time; and a history data storage sub-module, configured to record the real-time measurement data to be used as history data in the next calculation.

The relevant description of embodiments II to IV can be referred to for the implementation of this embodiment. This embodiment possesses all the beneficial effects of the above embodiments, which will not be repeated here.

It needs to be noted that there is no detailed description about various components in embodiments V and VI. If there is no conflict, all the technical features in embodiments I to IV can employ the device in embodiment V or embodiment VI, which will not be extended in detail here.

Obviously, those skilled in the art should understand that the above module or steps of the present invention can be implemented using a general-purpose computing device. They can be integrated on a single computing device or distributed over a network consisted of multiple computing device. Optionally, they can be implemented using computing device executable program code. Thus, they can be stored in a storage for being executed by the computing device. In some cases, the shown or described steps can be performed in an order different from the order here. Or, they can be made into various integrated circuit modules respectively, or some modules or steps therein are made into a single integrated circuit module for implementation. In this way, the present invention is not limited to any particular combination of hardware and software.

The above description is only to illustrate the preferred embodiments but is not to limit the present invention. Various alternations and changes to the present invention are apparent to those skilled in the art. The scope defined in claims shall comprise any medication, equivalent substitution and improvement within the principle of the present invention.

What is claimed is:

1. A method for measuring system performance in real time, comprising:

a foreground receiving a real-time measurement task comprising a measurement period parameter, wherein the real-time measurement task is constructed by a background according to concerned service data, and quantity of the service data is lower than a preset value;

the foreground extracting current data corresponding to the real-time measurement task from a performance measurement cache area according to the measurement period parameter;

the foreground acquiring real-time measurement data corresponding to the real-time measurement task according to the current data; and the foreground reporting the real-time measurement data to the background;

wherein the foreground acquiring the real-time measurement data corresponding to the real-time measurement task according to the current data comprises:

obtaining the real-time measurement data by an operation according to the current data and history data when a previous measurement period arrived; and recording the current data as the history data for a next calculation;

the method further comprising: when a conventional performance measurement period arrives, by the measurement period parameter of each real-time measurement task and a current time, determining the real-time measurement task, arrival time of two adjacent measurement periods of which spans the conventional performance measurement period; and recording the current data corresponding to the real-time measurement task spanning the conventional performance measurement period into a temporary data area; and obtaining real-time measurement data by the operation according to the current data and the history data when the previous measurement period arrived comprises: checking whether the arrival time of two adjacent measurement periods of the real-time measurement task spans the conventional performance measurement period, and if yes, then obtaining the real-time measurement data corresponding to the real-time measurement task by an operation according to the current data, the current data recorded in the temporary data area and the history data of the current data.

2. The method according to claim 1, wherein the quantity of the service data is 1.

3. The method according to claim 2, wherein the background is an operation and maintenance center and the foreground is a base station.

4. The method according to claim 1, wherein when there are a plurality of the real-time measurement tasks:

before the foreground extracts the current data corresponding to the real-time measurement task from the performance measurement cache area, the method further comprises: setting a reference timer with a preset duration; and when the reference timer times out, the foreground scanning all the current real-time measurement tasks one by one and judging whether a measurement period of each real-time measurement task has arrived according to the measurement period parameter of the each real-time measurement task and current time; and the foreground extracting the current data corresponding to the real-time measurement task from the performance measurement cache area comprises: when the measurement period of one of all the real-time measurement tasks arrives, the foreground extracting the current data corresponding to the one of all the real-time measurement tasks from the performance measurement cache area.

5. The method according to claim 4, wherein the measurement period parameter is greater than or equal to 5 s and less than or equal to 300 s.

6. The method according to claim 5, wherein the background is an operation and maintenance center and the foreground is a base station.

7. The method according to claim 4, wherein before the foreground scans all the current real-time measurement tasks one by one, the method further comprises: ranking the each real-time measurement task in all the current real-time measurement tasks according to an ascending order of the measurement period parameter; and the foreground scanning all the current real-time measurement tasks one by one comprises: when it is determined that the measurement period of the one of all the real-time measurement tasks has not arrived, stopping scanning the real-time measurement task after the one of all the real-time measurement tasks.

8. The method according to claim 7, wherein the background is an operation and maintenance center and the foreground is a base station.

9. The method according to claim 4, wherein the background is an operation and maintenance center and the foreground is a base station.

10. The method according to claim 1, wherein the background is an operation and maintenance center and the foreground is a base station.

11. A device for measuring device performance in real time, located at a foreground and comprising:

a task receiving module, configured to receive a real-time measurement task comprising a measurement period parameter, wherein the real-time measurement task is constructed by a background according to concerned service data, and quantity of the service data is lower than a preset value;

a data extraction module, configured to extract current data corresponding to the real-time measurement task from a performance measurement cache area according to the measurement period parameter;

a data processing module, configured to acquire real-time measurement data corresponding to the real-time measurement task according to the current data; and a data reporting module, configured to report the real-time measurement data to the background;

wherein the data processing module comprises:

a data acquisition sub-module, configured to obtain the real-time measurement data by an operation according to value of the current data and history data when a previous measurement period arrived; and a history data storage sub-module, configured to record the real-time measurement data to be used as the history data during a next calculation;

the data processing module further comprises: a temporary data storage sub-module, configured to, when a conventional performance measurement period arrives, by the measurement period parameter of each real-time measurement task and a current time, determine the real-time measurement task, arrival time of two adjacent measurement periods of which spans the conventional performance measurement period; and record the current data corresponding to the real-time measurement task spanning the conventional performance measurement period into a temporary data area; and a determination sub-module, configured to check whether the real-time measurement task spans the conventional performance measurement period; and the data acquisition sub-module is configured to, when the arrival time of two adjacent measurement periods of the real-time measurement task spans the conventional performance measurement period, obtain the real-time measurement data corresponding to the real-time measurement task by an operation according to the current data recorded in the temporary data area, the current data and the history data of the current data.

12. The device according to claim 11, wherein the quantity of the service data is 1.

* * * * *